US009838457B2

(12) United States Patent
Lakes et al.

(10) Patent No.: US 9,838,457 B2
(45) Date of Patent: *Dec. 5, 2017

(54) REDIRECTION SERVICE MECHANISM

(71) Applicants: Jesse Lakes, Seattle, WA (US); Jesse Pasichnyk, Seattle, WA (US)

(72) Inventors: Jesse Lakes, Seattle, WA (US); Jesse Pasichnyk, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/215,071

(22) Filed: Mar. 17, 2014

(65) Prior Publication Data
US 2014/0201350 A1 Jul. 17, 2014

Related U.S. Application Data

(63) Continuation-in-part of application No. 13/340,480, filed on Dec. 29, 2011, now Pat. No. 8,838,767.

(60) Provisional application No. 61/428,491, filed on Dec. 30, 2010, provisional application No. 61/793,599, filed on Mar. 15, 2013.

(51) Int. Cl.
G06F 15/173 (2006.01)
H04L 29/08 (2006.01)
G06F 17/30 (2006.01)
H04L 29/12 (2006.01)

(52) U.S. Cl.
CPC ........ H04L 67/02 (2013.01); G06F 17/30887 (2013.01); H04L 67/327 (2013.01); H04L 61/609 (2013.01)

(58) Field of Classification Search
CPC .......... G06F 17/30876; G06F 21/6263; G06F 17/2235; G06F 21/10; H04L 67/02; H04L 67/22; H04L 67/2814; H04L 41/5083; H04L 67/20; H04L 63/20; H04L 67/00; H04L 67/303
USPC ............ 705/14.55, 14.58; 707/728; 709/203, 709/224

See application file for complete search history.

(56) References Cited

U.S. PATENT DOCUMENTS

2002/0147790 A1* 10/2002 Snow .................. G06F 17/3087
  709/217
2003/0220837 A1* 11/2003 Asayama ............... G06Q 30/02
  705/14.16
2007/0288434 A1* 12/2007 Cohn ..................... G06Q 30/00

(Continued)

Primary Examiner — Farid Homayounmehr
Assistant Examiner — Lizbeth Torres-Diaz
(74) Attorney, Agent, or Firm — Brian J. Pangrle

(57) ABSTRACT

A system can include an interface that receives a URL that includes information; circuitry that processes at least a portion of the information for entity information and Internet merchant information; circuitry that accesses database entries in an entity field and in an affiliate program criterion field; circuitry that associates the URL with an entity field database entry based at least in part on the entity information; circuitry that includes selection logic that selects at least one affiliate program from a plurality of affiliate programs based at least in part on an affiliate program criterion field entry associated with the entity field database entry; and circuitry that formulates a redirection URL based at least in part on the Internet merchant information wherein the redirection URL comprises affiliate program information for the at least one selected affiliate program. Various other apparatuses, systems, methods, etc., are also disclosed.

12 Claims, 11 Drawing Sheets

(56) References Cited

U.S. PATENT DOCUMENTS

| | | | | |
|---|---|---|---|---|
| 2008/0140542 A1* | 6/2008 | Perron | ............... | G06Q 20/3224 |
| | | | | 705/27.1 |
| 2008/0172495 A1* | 7/2008 | Storm | ................... | G06Q 30/02 |
| | | | | 709/245 |
| 2008/0306782 A1* | 12/2008 | Ephrati | ................. | G06Q 30/02 |
| | | | | 705/14.41 |
| 2009/0228366 A1* | 9/2009 | Biris | ................. | G06Q 30/0601 |
| | | | | 705/26.1 |
| 2010/0058160 A1* | 3/2010 | Navarro | ............ | G06Q 10/0637 |
| | | | | 715/208 |
| 2014/0331119 A1* | 11/2014 | Dixon | ................. | H04L 63/168 |
| | | | | 715/234 |

* cited by examiner

See Fig. 11

US 9,838,457 B2

REDIRECTION SERVICE MECHANISM

RELATED APPLICATIONS

This application is a continuation-in-part of a pending U.S. Patent Application having Ser. No. 13/340,480, filed 29 Dec. 2011, which claims priority to and the benefit of a U.S. Provisional Patent Application having Ser. No. 61/428,491, filed Dec. 30, 2010, both of which are incorporated by reference herein, and this application claims priority to and the benefit of a U.S. Provisional Patent Application having Ser. No. 61/793,599, filed 15 Mar. 2013, which is incorporated by reference herein.

TECHNICAL FIELD

Subject matter disclosed herein generally relates to technologies and techniques for redirecting services.

BACKGROUND

Redirection services are provided by, for example, the HTTP protocol, which finds use with the Internet and the World Wide Web (e.g., interlinked hypertext documents accessible via the Internet).

For the Internet, resources (e.g., information, programs, etc.) are located using uniform resource locators or universal resource locator (URLs), a type of uniform resource identifier (URI). A URL includes, for example: a scheme name (e.g., HTTP), followed by a colon, two slashes, then, depending on scheme, a domain name (e.g., alternatively, an IP address), a port number, a path of a resource to be fetched or a program to be run, then, for example, for programs such as Common Gateway Interface (CGI) scripts, a query string, key-value string, etc., and an optional fragment identifier.

As to redirecting, using HTTP as an example, a redirect is a response with a status code beginning with 3 that induces a browser to go to another location, with annotation describing the reason, which allows for the correct subsequent action (such as changing links in the case of code 301, a permanent change of address). HTTP defines several status codes for redirection, including: 300 multiple choices (e.g., to offer different languages); 301 moved permanently; 302 found (e.g., optionally to specify redirection for a particular reason, which may be unspecified); 303 see other (e.g., for results of cgi-scripts); and 307 temporary redirect.

The foregoing status codes operate according to a redirect target in a location header of a HTTP response. Below is an example of an HTTP response that uses the status code 301 "moved permanently" redirect:

```
HTTP/1.1 301 Moved Permanently
Location: http://www.example.org/
Content-Type: text/html
Content-Length: 174
<html>
<head>
<title>Moved</title>
</head>
<body>
<h1>Moved</h1>
<p>This page has moved to <a
href="http://www.example.org/">http://www.example.org/</a>.</p>
</body>
</html>
```

A redirection service may be part of an information management system that provides an Internet link that redirects users to desired content. A redirect link may be used as a permanent address, for example, as to content that frequently changes hosts. As an example, the redirection service "bit.ly" shortens URLs through use of the bit.ly domain or other custom domains to generate shortened links. Redirection is achieved using an HTTP Redirect (e.g., URL forwarding from the short URL to the full URL).

On the Internet, various server variables are available, which may be part of a request (e.g., Request.ServerVariables). A request may include one or more parameters that specify information (e.g., server_variable). As an example, a variable "REMOTE_ADDR" may be specified as a parameter for the IP address of a remote host making a request, noting that an IP address can assist in geolocation. As an example, a user, using the browser, can enter a domain name for a webpage such that the browser instructs the computer to send a request to retrieve the webpage. To allow a server hosting the webpage to respond to the request, the request includes the IP address of the sending computer (i.e., where the information should be sent).

Depending on configuration, a server may also respond by sending a cookie (e.g., which may be stored by the browser application). A cookie includes some information, which a browser application may instruct a computer to send upon a subsequent request.

While some examples mention "browser" or "browser application", any application that allows for access to the Internet (e.g., using the HTTP) may be configured to make a request. As an example of a type of application, consider the various iTunes apps that may be implemented on an iPhone device such that the iPhone device can send a request.

On the World Wide Web, in a system known as affiliate marketing, a publisher can be any type of Web site, app, etc, from a well-known destination that offers consumers a range of shopping opportunities to a blogger that's just beginning to attract an audience to an app developer. As a loyal following is built, opportunities exist via affiliate marketing to monetize the site, the app, etc. by earning commissions. In such a scheme, the publisher can become an affiliate of an affiliate program where the publisher can displays ads, text links, or product links (e.g., from an advertiser or other entity) in return for a commission when a sale is made or when a lead is acquired. A sale may be tied to a specific action such as filling out a form or downloading a trial.

One affiliate network is LinkShare, which manages various different affiliate programs. LinkShare facilitates relationships between publishers and advertisers by providing the underlying technology that manages links, tracks results and commissions, and sends payments.

An affiliate programs may operate as follows: a site owner (e.g., affiliate) promotes goods or services of a merchant for sale on its site by including an "affiliate link" to direct a user to that merchant for a good, goods, a service, services, etc. When a user (e.g., a visitor) click on the affiliate link, an identification code is associated with the click (e.g., via a cookie) and in the event that the user takes an appropriate action (e.g., a visit, a conversion to a lead, a conversion to a sale) then the affiliate (i.e., the site owner) is paid by the merchant. The merchant or affiliate network will also usually provide tools for the affiliate to monitor various metrics, such as the number of visitors sent to a merchant site, the number of clicks or sales generated, and the earnings accumulated. Affiliate relationships may be established either with each merchant directly (e.g., Amazon.com), or through an established third-party affiliate network (e.g., LinkShare, TradeDoubler, Commission Junction, etc.).

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
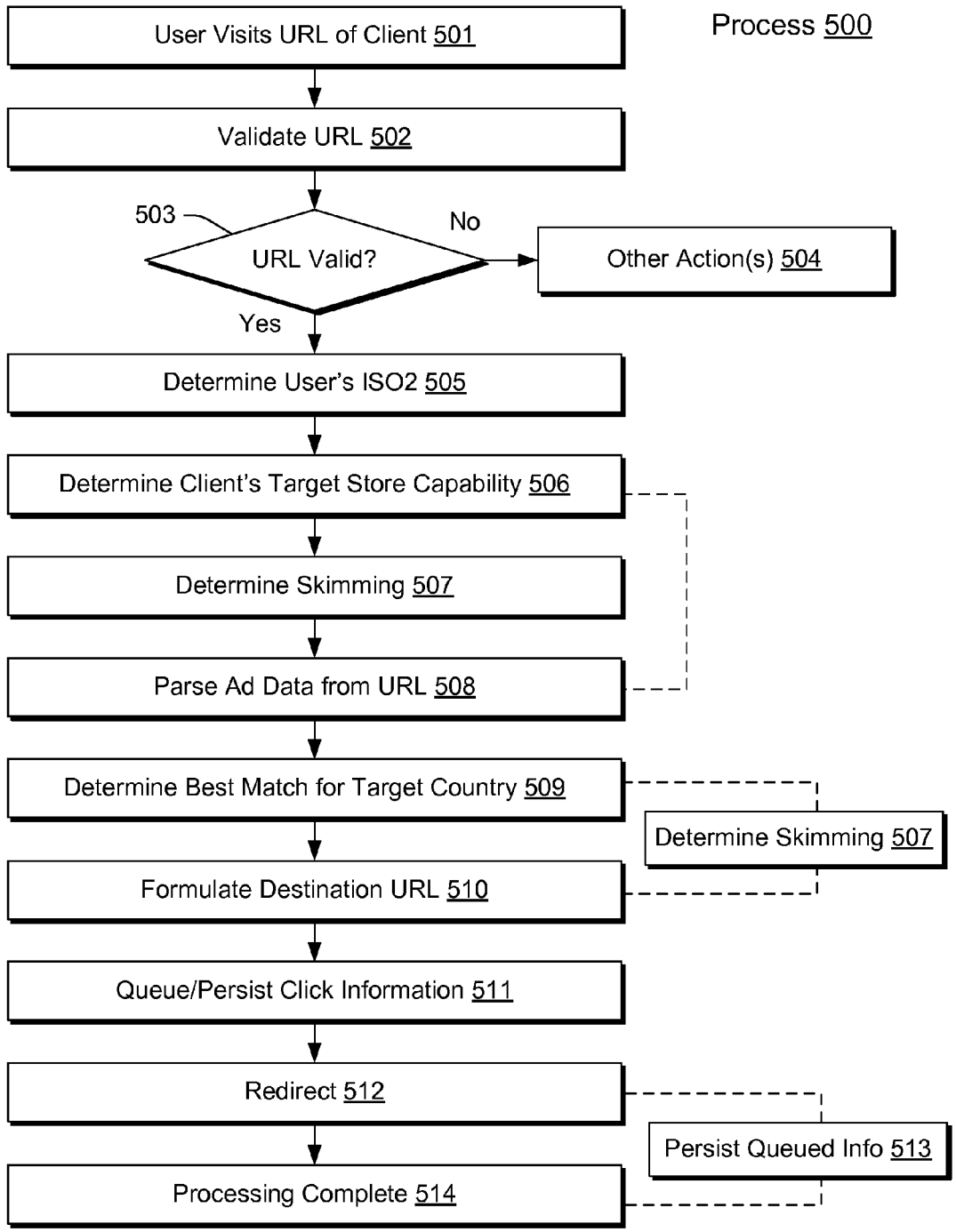
FIG. 1 is an example of an overview of a process (e.g., from navigating a user from clicking a link to arriving at specific online store front)

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Various examples of redirection services are described, for example, as associated with affiliates. As an example, a redirection service may allow multiple geographically segmented affiliate programs to be used simultaneously through the use of a single URL on a website or from within an application (e.g., an iPhone application or other application). In such an example, the approach can involve detecting a user's IP address through a link and determining the user's geographic location. The original URL may then be translated from a source country to a URL specific to a country that matches the user's location. Further, a new URL may be encoded with a geographically correct Affiliate network's tracking information and the user redirected to this URL. As an end result, the user reaches the appropriate destination in the geographically correct online store front with proper affiliate tracking information in place.

Traditionally, an affiliate program for an international brand is actually a series of separate affiliate programs, each for a specific geographically segmented online store front. These affiliate programs are typically administered through separate Affiliate Networks (the companies that aggregate affiliate Publishers and Advertisers, provide account management, tracking and payout) as Affiliate Networks tend to also be geographically segmented. They also tend to be clustered around certain regions or continents if multinational.

As described herein, for purposes of e-commerce, a redirection service may provide geolocation services and affiliate marketing services. As an example embodiment, consider a Publisher A that owns a website that is content based (for example, a blog). In order to monetize his traffic, he has affiliate links on his website to an online retailer's store front that sells products relevant to his website content. When clicked, these affiliate links direct his traffic to a specific item in the pre-specified online store front where purchases are made. The affiliate link contains specialized affiliate tracking information allowing sales inside the Advertiser's store front that originate from the Publisher's website or application to be deemed affiliated. The Advertiser, through the Affiliate Network, then provides a commission to Publisher A for referring that sale to the Advertiser. When Publisher A uses the standard affiliate links provided by a single Affiliate Network, it may, for example, generate a commission on sales in a specific online store front and does not receive a commission on sales made in international online store fronts by the same Advertiser. Using standard affiliate links also has the potential to direct his traffic to the wrong online store (wrong geographic location) where the traffic might not be allowed or able to purchase the intended goods. One example is if the traffic may need to have a bank account or credit card from the same region to purchase from the online store front or if the shipping costs would be too high due to international transfer. The traffic may also receive an error when following a standard affiliate link as their settings for their default store front will conflict with the store front to which the traffic is directed.

Using a redirection service, the Publisher's specialized affiliate links would first send traffic to the Service Provider where the traffic's proper country is determined systematically. The traffic is then dynamically built a new, custom URL that is specific to the geographically-appropriate target online store front. The traffic is redirected through the proper Affiliate Network (as determined from the user's geographic location) to the correct store. This keeps the user from receiving an error, allows the traffic to land on the most relevant page for the link they clicked and provides the ability to purchase the intended item(s). This also ensures the Publisher has the potential of receiving commissions from the affiliate program for that country's specific store.

As described herein, a redirection service may provide for allowing multiple geographically segmented affiliate programs to be used simultaneously through the use of a single URL on a website (e.g., accessed via a web browser application) or from within an application (e.g., an iPad application, an iPhone application, etc.). As an example, a process can use logic to determine the geographic location of the user and then translate and encode a URL into a geographically relevant affiliate link which includes the affiliate tracking information and directs the user into the appropriate store front based on location.

In various examples described herein, a redirection service may allow Publishers to utilize more than one geographically segmented affiliate program through multiple Affiliate Networks to capitalize on international Internet traffic.

FIG. 1 demonstrates an example of an overall process 500 that happens when clicking on a link 501. The process 500 starts with a link (e.g., URL) on the Publisher's site or application being clicked by a user and finishes with a final redirection 512 with the user ending up at the most relevant page in the appropriate store front. Once the process 500 starts and the user clicks on that link 501, the URL Validation process takes place 502.

Figure 2:
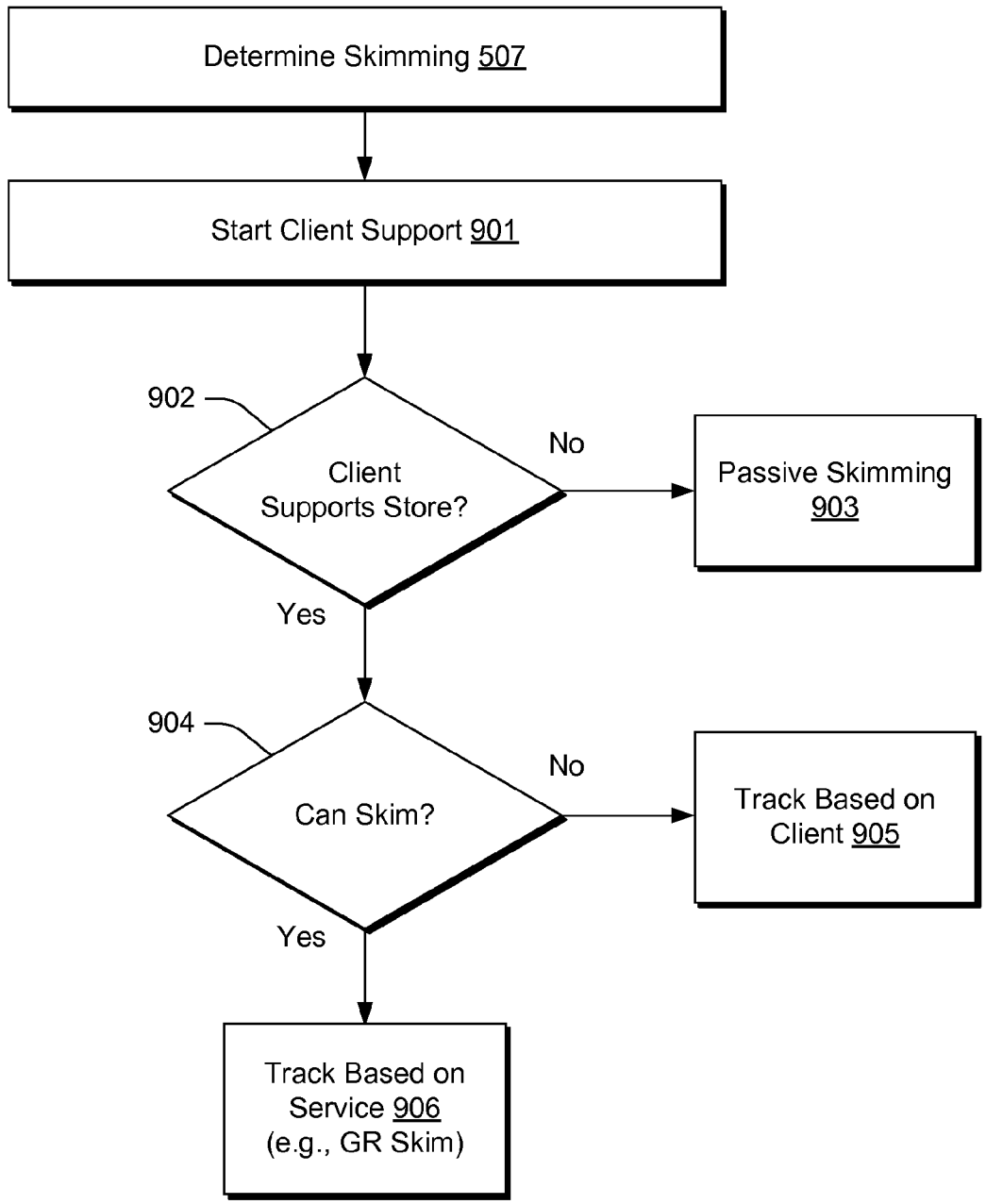
FIG. 2 is an example of a flowchart of the Skimming process shown in FIG. 1.

Once the target online store front has been resolved, the next sub-process may be to figure out if the provider of this service can "skim," which is the transparent process of rerouting a click with an affiliate code specific to the Service Providers, instead of the Publishers (see determine skimming block 507, which may optionally be located elsewhere in the process 500). This is an example of a revenue model the Service Provider may use to be compensated for providing the Publisher with the service; other models could be pay per click, monthly charge, etc. An example of a Skimming process is shown in FIG. 2.

After the skimming determination process, the original deep link (e.g., landing page URL, search link, item link, category link, etc.) is analyzed in order to parse the Advertiser's data 508. This involves breaking down the link to determine what data is contained in the link.

If at this point the data is parsed correctly, the service will start the procedure to determine the best matching item for the target country's store front (which was determined by the user's ISO2) 509. The service determines if the specific item mentioned in the original URL can be found and, if so, uses relevant metadata for that item to find a similar item in the geographically correct online store front.

If the requested digital good, hard good, service, etc., is available in the user's location the next step is to formulate the original deep link (e.g., landing page URL, search link, item link, category link, etc.) into a link that includes all of the updated information for that user's geographical location (e.g., store front, item number, etc.) 510. The Publisher's relevant affiliate tracking information is also applied at this step (or Service Provider's if being skimmed) to ensure the sale is affiliated.

Figure 3:
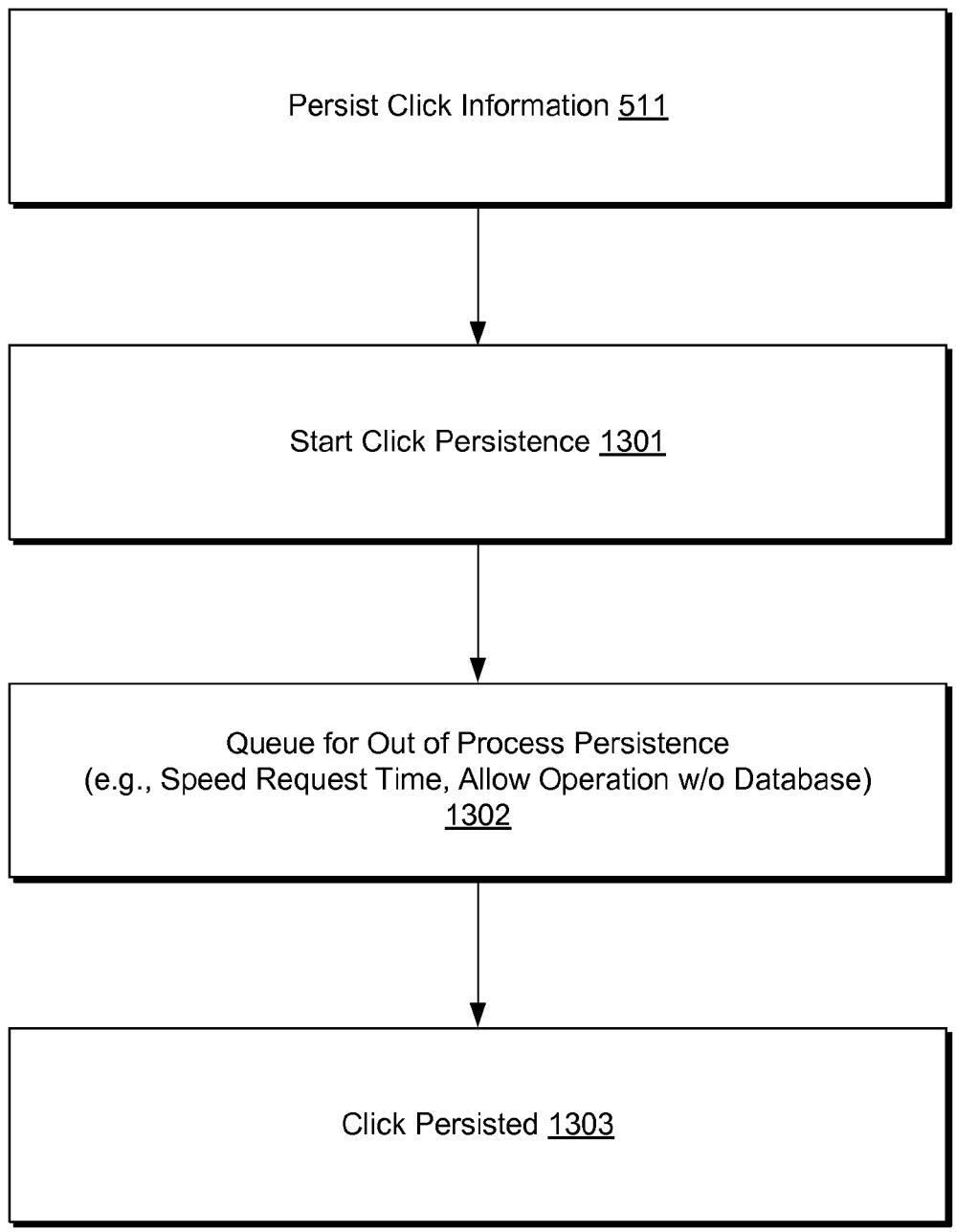
FIG. 3 is an example of a flowchart of the click information persisting process shown in FIG. 1.

Information pertaining to the click, including the user's ISO2, referring URL, date stamp, source country and destination country may be persisted (e.g., recorded) per a persist block 511. As an example, various types of information may be persisted, for example, for purposes of report generation, etc. As indicated by an optional persist queued information block 513, clicks may be queued in memory by the persist block 511, for example, to a certain number or after a certain time to be written to a database (e.g., instead of writing this information to the database after every click). Such an approach allows for speed optimization. FIG. 3 shows an example of a process 1300 in more detail.

For the process 500, a user is redirected to a new link that has been appropriately formulated and formatted 512. Once redirected, the user arrives at an appropriate online store front while affiliate tracking information is preserved and applied. As an example, such a process may occur where the store front is an Amazon.com store; noting that for other stores, a user may be redirected via an affiliate network (e.g., an affiliate network of an iTunes store).

The process 500 may be hidden from a user, i.e., the user has no indication that one or more redirects have occurred (e.g., to a redirection service and then to a store front other than the one associated with a link on a site). The process 500 can be traceable for the Publisher and Advertiser such that the Publisher gets credit and such that the Advertiser can track a sale. In the end the user will arrive at an online store front on the page, preferably with the item most relevant to the referenced item in the original link. As shown in FIG. 1, for a redirection service, after processing of the click, the process 500 may be complete (see completion block 514).

However, if an online store front is available in the users geographical region, the service then searches to see if the online store front has an affiliate program per a decision block 804. If the store front does, the service will then continue on to the next step and will use an affiliate link 806. Alternatively, if the online store front does not have an affiliate program, then the service will continue without using an affiliate link 805. If the link continues without including the affiliate parameters then the Publisher will not be credited for this sale. However, the user will still make it to the geographically correct online store front to make the purchase, instead of being brought to a dead link or the wrong online store front where they might not be able to make the purchase.

As an example, a redirection service may redirect to a most geographically relevant store. For example, someone from Austria may buy regularly from an Amazon.de Internet store in Germany. Accordingly, traffic from Austria may be deemed as being appropriate for Germany. As an example, a redirection service may optionally encode all traffic from a country that does not have an affiliate program for a particular store or stores to pick up on any travelers or people that may have figured out a way to make purchases in a specific store (e.g., consider a scenario where people in Malaysia are using US iTunes gift cards to set up an account and buy content from the US iTunes store because there is no store in their country or the store servicing Malaysia lacks the desired type(s) of content or product). A process may determine if metrics can be preserved while affiliate encoding all links and, if so, such encoding may occur.

FIG. 2 shows a process 900 that corresponds to the block 507 of the process 500 of FIG. 1. In the process 900, client support commences in a commencement block 901. A decision block 902 follows that decides if the Service Provider can use this particular link in order to "skim." Skimming is defined as the transparent process of rerouting a click with the Service Provider's affiliate code, instead of a Publisher's code for a pre-defined percentage of clicks. For example, if the effective skim rate is negotiated to be 15%, then 15 out of 100 clicks would be redirected to use the Service Provider's affiliate tracking parameters instead of the Publishers. Skimming may be a preferred revenue model of the Service Provider; however, one or more other types of models may be available, for example, depending on affiliate program or lack thereof. If the Publisher is not active with an affiliate program for a specific online store front but there is an active affiliate program then, by default, this link is skimmed.

As shown in FIG. 2, per the decision block 902, the process 900 will proceed to skip skimming 903 or to another decision block 904 to determine if skimming is allowable. If not, the process 900 continues at a tracking block 905 to track based on client. Otherwise, the process 900 continues at a tracking block 906 to track based on service (e.g., the GeoRiot service skims).

In the example of FIG. 2, at block 903, passive skimming may be handled as in block 906, where the redirection service may skim. A process may include checking to determine whether an Internet store has an affiliate network supported, if so then the process may include checking to determine whether its supported and continue on to, for example, block 904. If not supported, then such a process may include checking to determine whether the redirection service provider supports it. If so, the redirection service provider may skim it; otherwise, it may be passed on without any affiliate tracking (e.g., sent straight to the appropriate Internet store). In instances where a client supports the Internet store and the redirection service provider does as well, a default state may be to the decision logic block 904 (e.g., "can skim?").

After determining if the Publisher or the Service Provider will receive credit for any possible sales (through the skimming process) the process 500 starts to parse the data from the original URL. The service looks at the data within the link and checks to see if the pertinent information matches any of the Affiliate Networks for the particular store front, for example, via a series of decisions. These decisions may aim to determine which of a number of Affiliate Networks the original link is from. As an example, the affiliate network (or at least a country, store, etc.) may be provided in a link indirectly according to a redirection service ID for a client or, additionally or alternatively, via metadata. If the form of the URL does not match any of the affiliate links, a Malformed URL error is thrown. If the form matches one of the Affiliate Networks, then the next step is to create a matching Parser to read the data from the URL. Parsing of ad data from the URL occurs next. Once the data has been read, the service may optionally query a data store specific to the Advertiser's store front to verify that the data is present. Such a query may be germane to one or more source/target country stores via an API, cache, local data, etc. Such a query may be local, remote or a combination of local and remote queries (e.g., via an API of an Internet store, a proprietary database of a redirection service, etc.).

After parsing, a decision may follow that decides if the data matches what can be found in the store front. If so, the process continues to the next step with the parsed data. If not, the process will halt and throw a Malformed URL error.

An example of a link "build" process can optionally programmatically build a redirection service provider link from a catalog of raw landing page links. Such an approach may be appropriate where a database of raw links exists and links can be programmatically built. As an example, a base redirection service link may be http://target.georiot.com/Proxy.ashx?grid=64& where to this is added "GR_URL=" with a URL encoded raw landing page URL attached to the end. For example, if a target raw landing page URL is http://itunes.apple.com/us/album/once/id331012810?i=331013504, the URL is encoded to: http%3A%2F%2Fitunes.apple.com%2Fus%2Falbum%2Fonce%2Fid331012810%3Fi%3D331013504. Given a base "georiot" URL (e.g., http://target.georiot.com/Proxy.ashx?grid=64&), to this may be added "GR_URL=", followed by the encoded version of the raw landing page URL (e.g., as in previous step) to yield a quick build style link: http://target.georiot.com/Proxy.ashx?grid=64&GR_URL=http%3A%2F%2Fitunes.apple.com%2Fus%2Falbum%2Fonce%2Fid331012810%3Fi%R%3D331013504. FIG. 16, which represents a breakdown of the process 1500 into five general steps: Receive Request 1601, Locate 1602, Translate 1603, Encode 1604 and Redirect User 1605.

Figure 4:
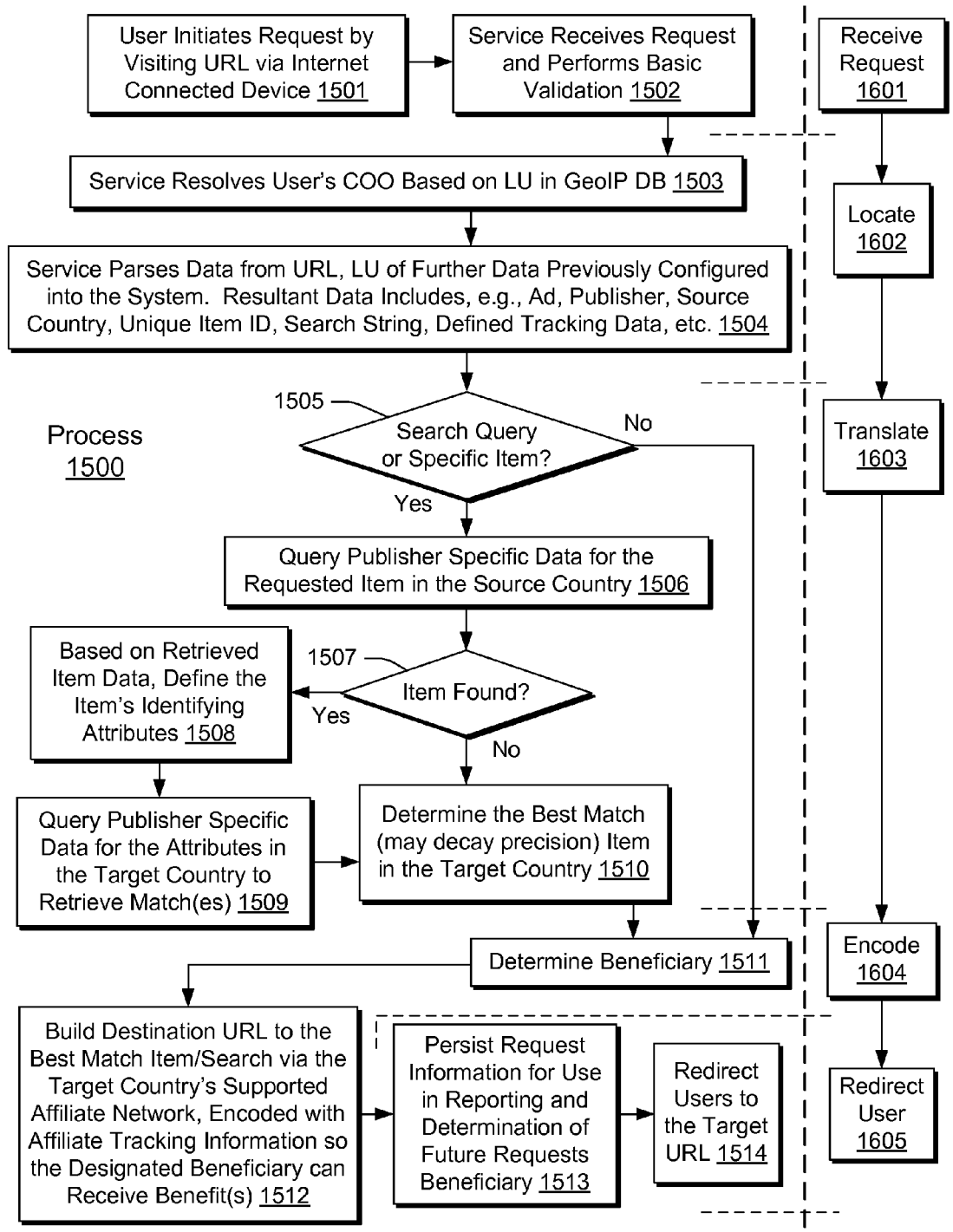
FIG. 4 is an example of an overview of a process starting with receiving a request through redirecting a user to an appropriate destination.
Figure 5:
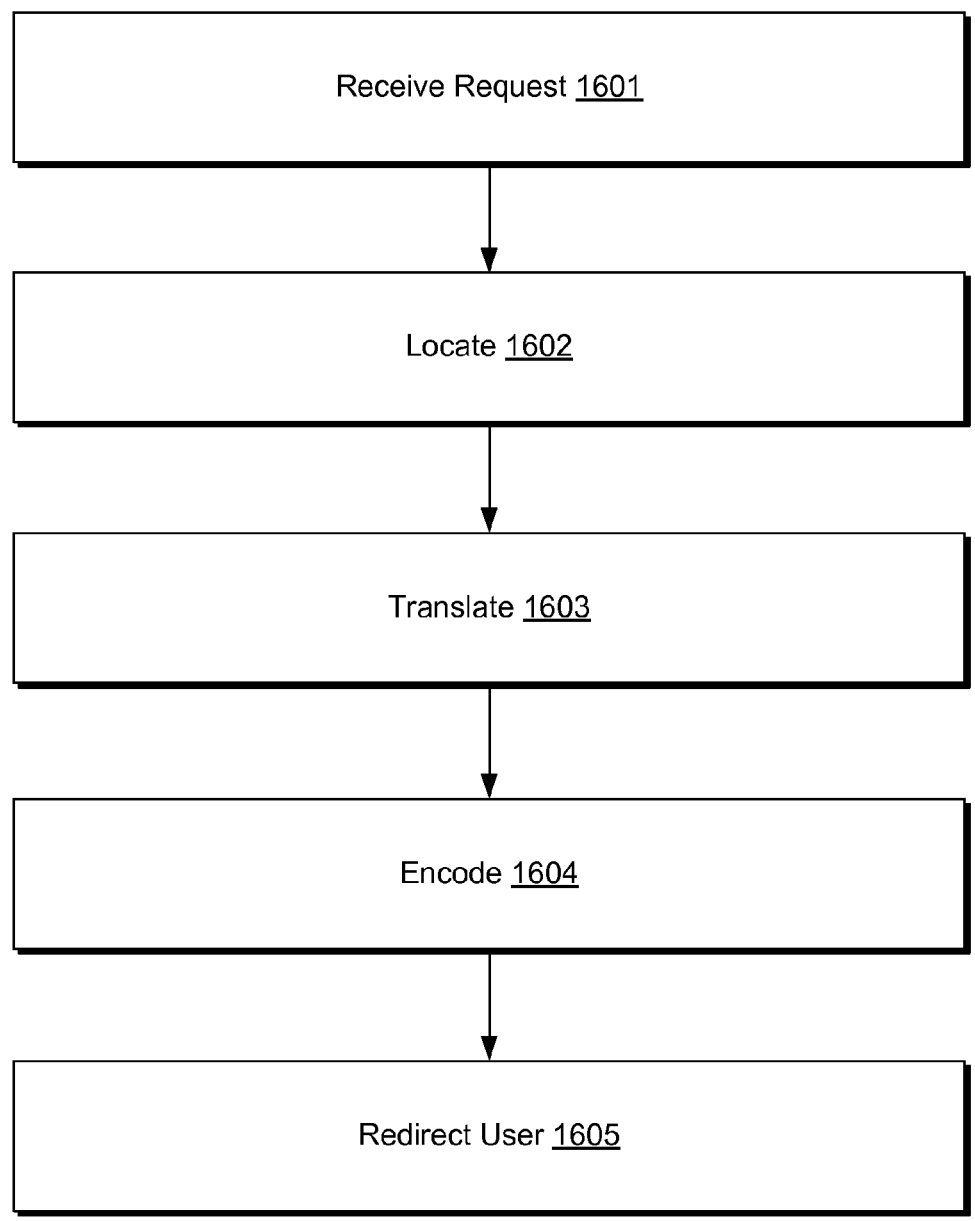
FIG. 5 is an example of a flowchart of details mentioned in FIG. 4.

As shown in FIGS. 4 and 5, the process 1500 or 1600 starts when the service receives a request through a specialized affiliate link (Receive Request 1601). For the second step, the service goes through a process to determine where the user is geographically located by looking up their IP address in a GeoIP database. This step also includes parsing relevant information from the URL (Locate 1602). After the user is located, the service will then determine the most applicable URL for the user by identifying data in the requested URL. The service will lookup details about the intended destination, whether it be to a specific item, or more general (e.g., this can include taking into account search items, category links, etc.). The service will then, using the data from the previous query, locate the best match for the user's geographic location (Translate 1603). Once the end point is determined, the service will create a new URL for the store front and item. If there is no perfect match for the intended item the system will allow the precision to decay until a best match is made. The new URL takes into account the appropriate affiliate encoding (Encode 1604). Finally, the user will be redirected to the appropriate affiliate network (Redirect User 1605).

The next step 1511 for the service is to determine who will be the beneficiary of the potential commissions that come from this URL through the process of "skimming". Skimming is defined as the transparent process of rerouting a click with the Service Provider's affiliate code, instead of a Publisher's, for a pre-defined percentage of clicks. For example, if the effective skim rate was 15% then 15 out of 100 clicks would be redirected to use the Service Provider's affiliate tracking parameters instead of the Publisher's.

The determined beneficiary will have their specific affiliate tracking parameters attached to the final URL. If the Publisher is not active with an affiliate program for a specific online store front but there is an active affiliate program then by default this link is skimmed. The encoding of the new URL with the Service Providers affiliate tracking information is a revenue driver.

Once the end destination and beneficiary are determined, the service will, based on information associated with the original URL, formulate a new URL to get the user to the proper destination based off the steps above 1512. The new URL will be encoded with the affiliate tracking information for the beneficiary, and will point to the result that was determined to be the best match from the original URL. If the destination online store front does not have an affiliate program the link will not contain any tracking code.

After the URL has been reformulated (e.g., reformulated, translated, etc.) into the new deep link with the proper tracking and affiliate codes, the click information is then persisted into the Service Provider's database in step 1513. The information regarding the geolocation, date, time, and item they clicked on is queued up to be stored (e.g., persisted) into the Service Provider's database for tracking, reporting, and future skimming purposes (e.g., stored locally and then directed to a database for longer term storage). This information may be later used for the Publisher's benefit and determining traffic origin and for trend analysis purposes, reports, etc.

Once the click information has been queued for persistence into the Service Provider's database, the last step 1514 in the process is to redirect the user using the new URL created. The entire process up through this point is transparent to the user. Finally, the user is redirected to the best match item in their geographically specific store, or into the default store if their location doesn't have a unique store front.

A method for redirection may commence in a click block where a US based user clicks on a client's website (e.g., or a user interface presented via an application executing on a device). As to the term "client", this refers to a client of a redirection service "GeoRiot". In another click block, the user clicks on an affiliate link (e.g., activates a link via an application such as a web browser application or other type of application). In a performance block, the redirection service takes the link (e.g., a URL) and performs various actions, including determining geolocation, deciding whether translating is required and encoding. As indicated in a redirect block, the process performed by the redirection service occurs without having the user "stop" on the redirection service's site (e.g., target.georiot.com).

In a reception block, an indicated affiliate (LinkShare aka linksynergy) may receive the affiliate link with affiliate information from the redirection service (GeoRiot). In a concatenation block, the affiliate concatenates the landing page information and tracking information (e.g., using an ampersand, as specified by an Internet store, etc., having an affiliate program). In a transmission block, the affiliate transmits the link and converts the tracking information to an affiliate cookie. In a landing block, the user lands at an appropriate landing page for the Internet store where the affiliate cookie is set for consumption by the Internet store's affiliate program for the benefit of the affiliate.

As an example, as a user may be a US based user, a redirection service (GeoRiot) may determine that the appropriate Internet store is a US iTunes store, which has an affiliate program (LinkShare) for which the client is a member.

As an example, a method may "skip" an affiliate network redirect while still appending parameters to the end of a store link (e.g., just as an affiliate network may perform), for example, to enhance performance (e.g., end to end performance).

As to skimming, a redirection service may practice passive skimming, for example, where the redirection service collects commissions where its client is not a member of an affiliate program in a foreign country. As to active skimming, this pertains to situations where the client of the redirection service is active with an affiliate program associated with destination store but the affiliate tracking is switched to use the redirection service's account instead of the client's accounts. As an example, active skimming may happen for countries where translation is necessary (not for their base program/country/link) and active skimming may happen where passive skimming is not high enough to meet an agreed upon percentage (e.g., 15% or other percent).

In the process of an affiliate network redirect, a click may be recorded and a cookie placed. For example, a user may be redirected to an iTunes Preview page where the affiliate cookie is placed and where the user is then redirected onto the relevant landing page inside the store. In such an approach, because the user was directed to the correct store with the proper affiliate tracking the user is able to buy the product they were initially interested in purchasing and the publisher of the site will receive any resulting commissions. As an example, if the user clicks on a link for an iTunes item and it is determined that the user is coming from a country where there is no affiliate program, that user may be redirected to the proper iTunes store (e.g., according to a translation block, which can translate a link for one country store to a different country store based on country of a user). Accordingly, the user will be able to purchase her desired item but no commission will be generated because there is no supporting affiliate program for that store.

While an example may include a redirection service and an affiliate program site, a redirection service may optionally be included as a service of an affiliate program site. As an example, a determination process may optionally be implemented to determine a beneficiary (e.g., one or more parties that should or may benefit from traffic, a redirect, a purchase, etc.).

Rerouting each user to the right item in the correct Internet store drastically improves affiliate conversion rates for a site owner (e.g., publisher). Instead of sending every click to one Internet store and hoping that store can purchase from that store, a redirection service can act to send each user to an appropriate regional Internet store where he has a better chance of finding the item and making a purchase.

It may be assumed throughout this description that each location, user, client, affiliate, etc., has appropriate hardware and software to perform various actions. Known terminals, processors, routers, switches, modems, servers, connecting links, communication methods, ISPs and/or output devices/interfaces may be used, as appropriate.

Figure 6:
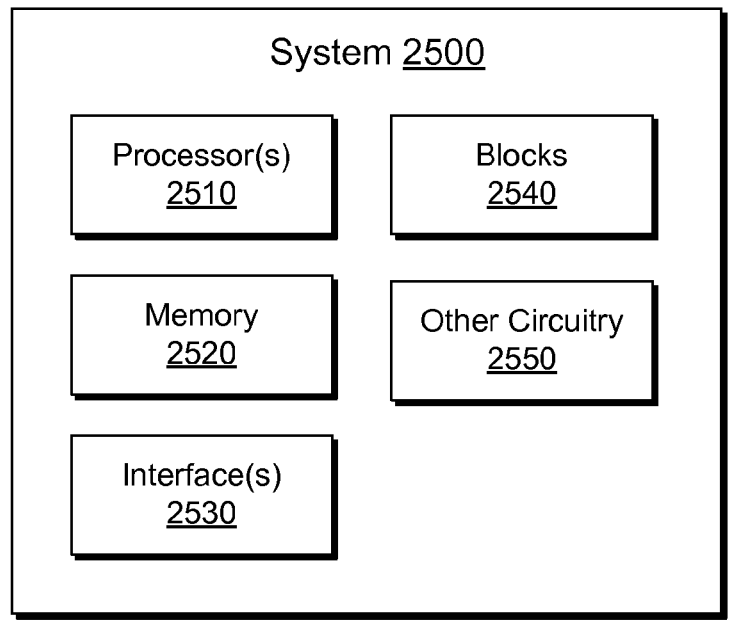
FIG. 6 is an example of a system (e.g., a server or other computing device) and an example of a method that may transmit, receive, etc., data structures.
Figure 6:
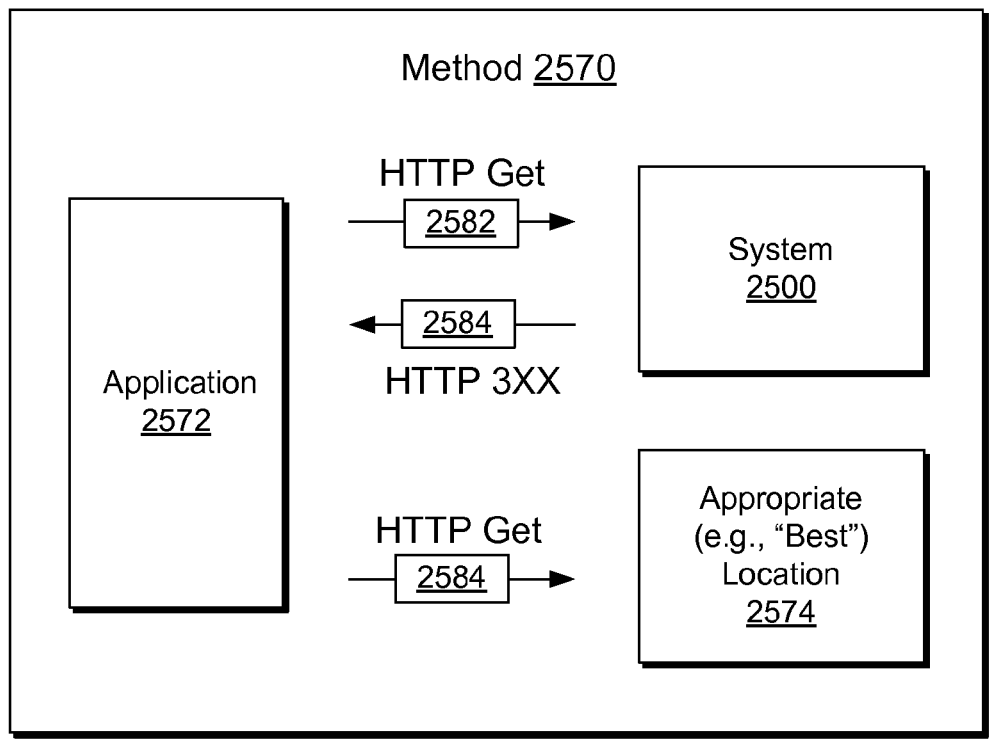

FIG. 6 shows an example of a system 2500 as including one or more processors 2510, memory 2520, one or more interfaces 2530, one or more blocks 2540 and other circuitry 2550 and an example of a method 2570 that includes various data structures 2582 and 2584. The system 2500 may be a server configured to run one or more services to serve needs of users of other computing devices, systems, etc., on a network. As an example, the system 2500 may include circuitry configured to perform one or more actions described herein. Circuitry may be in the form of hardware, software, etc. In the example of FIG. 6, the processor(s) 2510 can access the memory 2520, which may store instructions provided in the form of one or more blocks 2540. A block may be a computer-readable medium that includes processor executable instructions that instruct the system 2500 to perform various actions. In various figures, blocks are presented with respect to processes, methods, etc. Such blocks may be in the form of one or more computer-readable media. Such computer-readable media may be "non-transitory", in other words, physical media (e.g., memory, optical disk, etc.) as opposed to a transitory medium such as space, which may carry transitory signals.

As to the one or more interfaces 2530, the system 2500 may include one or more network interfaces configured for communication with the Internet, either directly or indirectly. As to the other circuitry 2550, it may include wireless circuitry configured for communication via one or more wireless networks, optionally including one or more "cellular" networks (e.g., 3G, 4G, etc.). The system 2500 may optionally be configured as a single device or as a collection of devices.

In the method 2570, an application 2572 is configured to communicate directly or indirectly via the Internet (e.g., a web browser or other application). In the example of FIG. 6, communication is shown as occurring via HTTP, noting that other types of communication may be used. The system 2500 acts to direct the application 2572 to an appropriate location 2574 (e.g., the "best" location). As shown, the system 2500 includes features to act on receipt of a URL 2582 and to formulate a redirect URL 2584. As described in various example, the redirect URL 2584 may be a "best location" URL, for example, based on logical operations performed by the system 2500, which may include one or more operations that rely on resources external to the system 2500.

Figure 7:
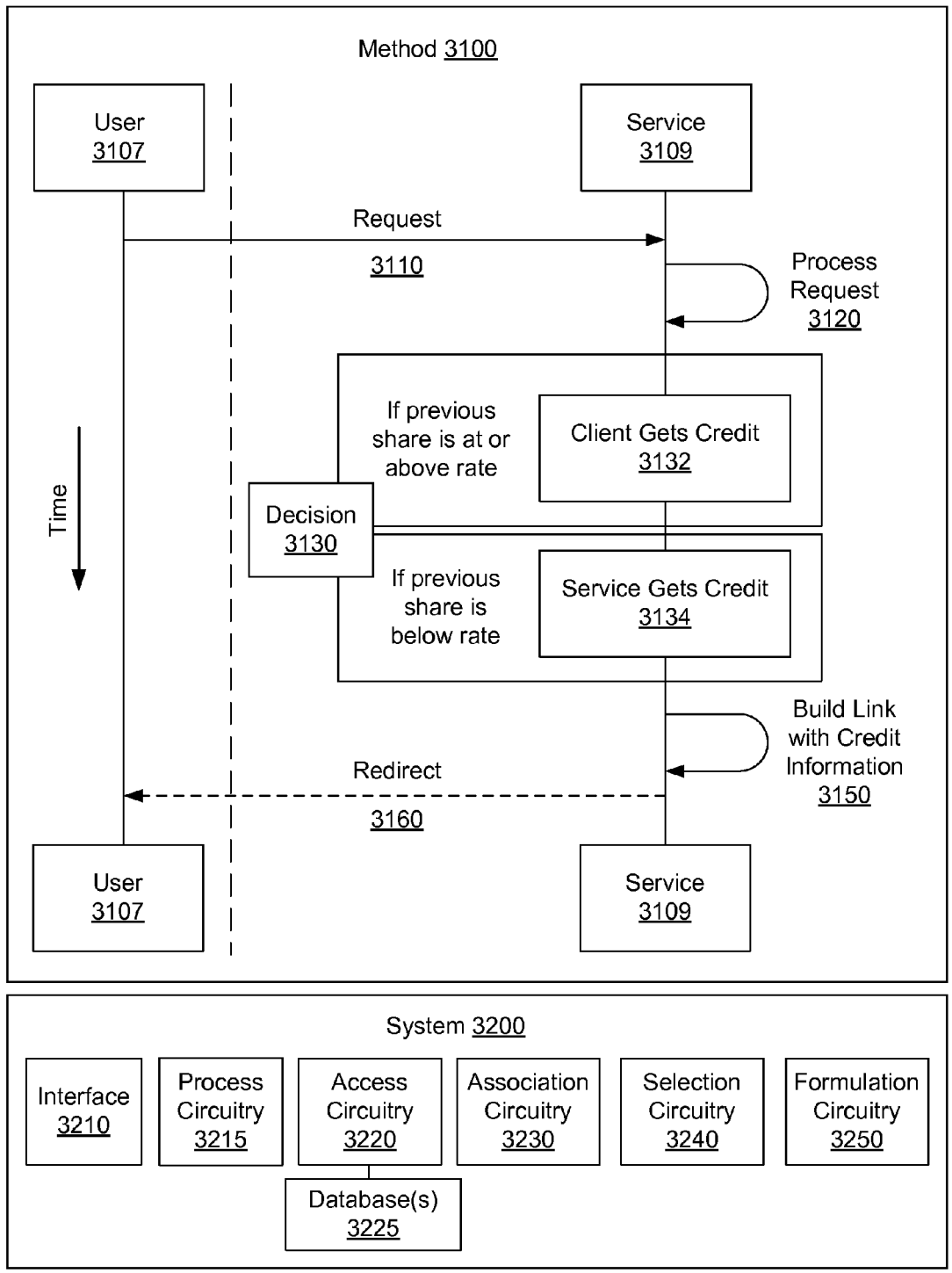
FIG. 7 is an example of a method and an example of a system.

FIG. 7 is an example of a method 3100, which may be referred to as a "Click Share" method or mechanism. As shown in FIG. 7, the method 3100 may service a user 3107 via a service 3109 where the service 3109 has a client. For example, the user 3107 may visit a website of a client of the service 3109 and click a graphic, etc. that causes transmission of a request 3110. As shown, the service 3109 may process the request 3120. As an example, processing of the request may include making a decision 3130. For example, "credit" may be associated with a "click" (e.g., consider an affiliate program, etc.). The decision 3130 may determine based at least in part on one or more criterion if a client of the service 3109 gets credit 3132 or if the service 3109 itself gets credit 3134. As shown, based at least in part on the decision 3130, the service 3109 may build a link with credit information 3150 (e.g., a URL with affiliate program information, etc.). As an example, the method 3100 may include redirecting the user 3107 to a location, for example, using a redirection link 3160 (e.g., redirection URL, etc.).

As an example, the method 3100 may be implemented in a manner that is substantially invisible to the user 3107. For example, the user 3107 may receive no indication that the decision 3130 is made, that credit is determined, etc.

FIG. 7 also shows an example of a system 3200 that can include an interface 3210 that may receive a URL that includes information, which may include entity information and Internet merchant information and/or which may reference entity information and Internet merchant information; circuitry 3215 that may process at least a portion of information (e.g., information included in a received URL) for entity information and Internet merchant information (e.g., via parsing, look-up, etc.); circuitry 3220 that may access database entries in an entity field and in an affiliate program criterion field (see, e.g., database(s) 3225); circuitry 3230 that may associate a URL with an entity field database entry based at least in part on entity information; circuitry 3240 that may include selection logic that selects at least one affiliate program from a plurality of affiliate programs based at least in part on an affiliate program criterion field entry associated with an entity field database entry; and circuitry 3250 that may formulate a redirection URL based at least in part on Internet merchant information where the redirection URL includes affiliate program information for a selected affiliate program or selected affiliate programs. As an example, the system 3200 may be configured to perform one or more services such as a service or services of the method 3100.

As an example, a system may include accessing an affiliate program criterion field entry or entries that specify one or more of a percentage, an operating system, a device type, a type of good and a location.

As an example, selection logic of a system may output an affiliate program based at least in part on historical information for the entity field database entry. In such an example, the output affiliate program may be selected. As an example, selection logic may select more than one affiliate program.

As an example, a system may include a database. In such an example, circuitry that accesses database entries in an entity field and in an affiliate program criterion field may accesses the database. As an example, such a database may include database entries for a plurality of entities and for a plurality of affiliate programs (e.g., selectable based at least in part on one or more criteria, etc.). As an example, a cache may be considered to be a database. As an example, a cache may include cache structures (e.g., key and value pairs, etc.). As an example, information in a cache may include entries, which may be considered to be database entries (e.g., directly and/or indirectly entities, affiliate programs, etc.). As an example, a system may include circuitry that accesses a cache. Such a system may include circuitry to receive information from the cache where such information may be used, at least in part, to obtain entity information and/or Internet merchant information. As an example, a system may include circuitry to access a cache and circuitry to access a database, optionally based in part on information stored in the cache.

As an example, a URL may be a short URL, for example, a short URL that may point to a database that includes information that may be associated with a long version of the URL (e.g., link). As an example, information may be ascertained at least in part from a short URL, for example, a short URL may include "georiot.co/amazon" where the entry "amazon" in a key field of a database that may list relevant data.

As an example, a method may include receiving a URL via an interface where the URL includes information; processing at least a portion of the information for entity information and Internet merchant information; accessing database entries in an entity field and in an affiliate program criterion field; associating the URL with an entity field database entry based at least in part on the entity information; implementing selection logic that selects at least one affiliate program from a plurality of affiliate programs based at least in part on an affiliate program criterion field entry associated with the entity field database entry; and formulating a redirection URL based at least in part on the Internet merchant information where the redirection URL includes affiliate program information for the at least one selected affiliate program.

As an example, a computing system may include an interface associated with a service where the interface receives a URL responsive to a user activating an Internet link via an application at a website of a client of the service where the URL includes metadata (e.g., information) for an item specified by a country-based Internet store; circuitry that identifies a base country of the user by resolving an Internet Protocol address associated with the user; circuitry that decides if the base country of the user differs from the country of the country-based Internet store; circuitry that formulates, if the base country differs, a URL for redirecting the user to a country-based Internet store for a country that corresponds to the base country of the user where the URL for redirecting includes affiliate program information for an affiliate program associated with the service and the country-based Internet store for the country that corresponds to the base country of the user; and circuitry that formulates, if the base country does not differ, a URL for redirecting the user to the country-based Internet store where the URL for redirecting includes affiliate program information for an affiliate program associated with the client of the service and the country-based Internet store.

Figure 8:
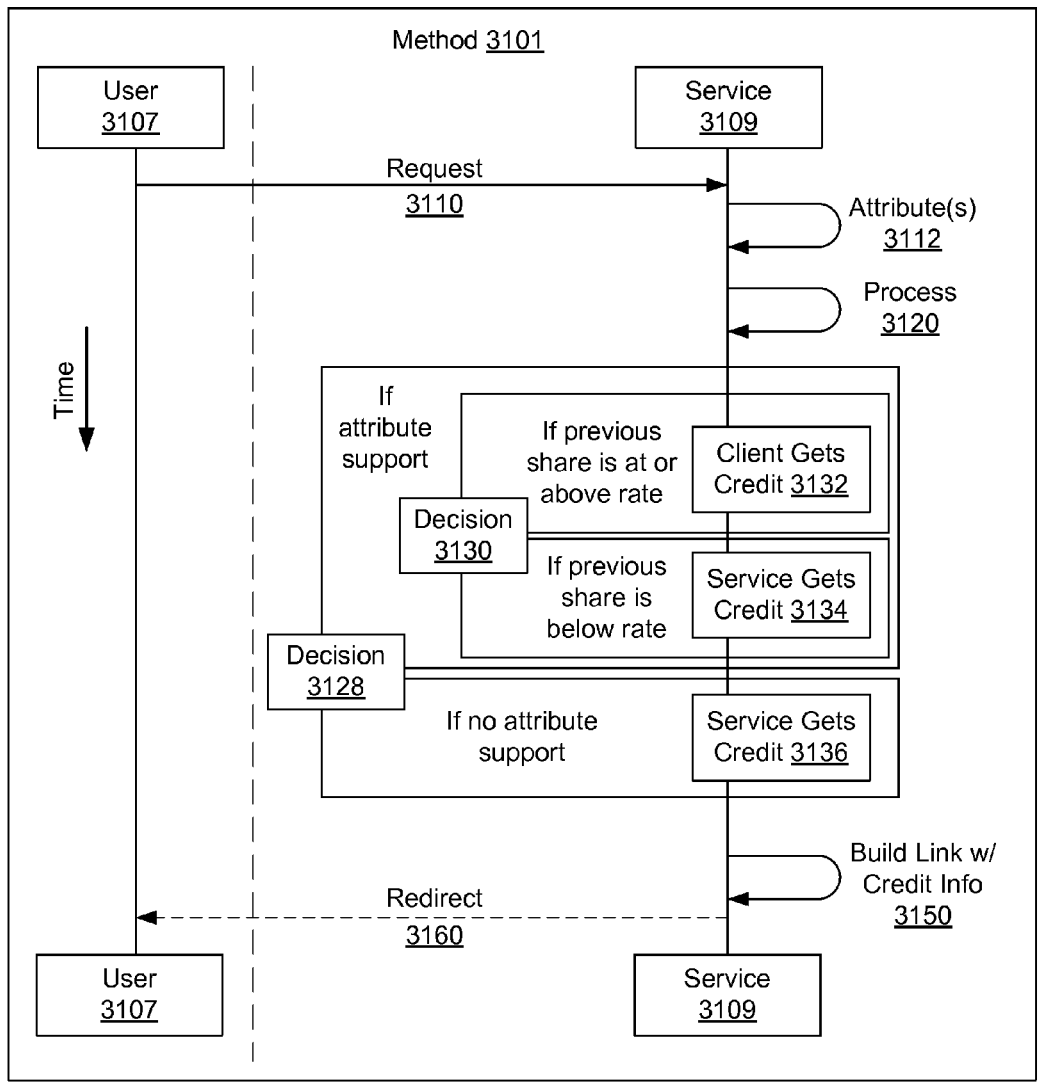
FIG. 8 is an example of a method.

FIG. 8 shows an example of a method 3101 that includes various features, actions, etc. of the method 3100 of FIG. 7. As shown, the method 3101 may include determining one or more attributes 3112, for example, one or more attributes that may be associated with the user 3107 (e.g., a device, a location, an OS, an application, etc.). As indicated, information may accompany a request, which itself may directly include one or more attributes and/or may provide information that may assist with determining one or more attributes (e.g., via parsing, locating, searching a database or databases, etc.).

In the example of FIG. 8, a decision 3128 may be made at least in part on the basis of one or more attributes, attribute support, etc. For example, if no attribute support exists, the method 3101 may proceed to credit the service 3109 (see, e.g., block 3136). As to the decision 3130, it may optionally account for one or more attribute in deciding credit (e.g., client gets credit 3132, service gets credit 3134 or other type of crediting).

In the example of FIG. 8, crediting of the service 3109 per the block 3134 may be an active share credit while crediting of the service 3109 per the block 3136 may be a passive share credit.

Figure 9:
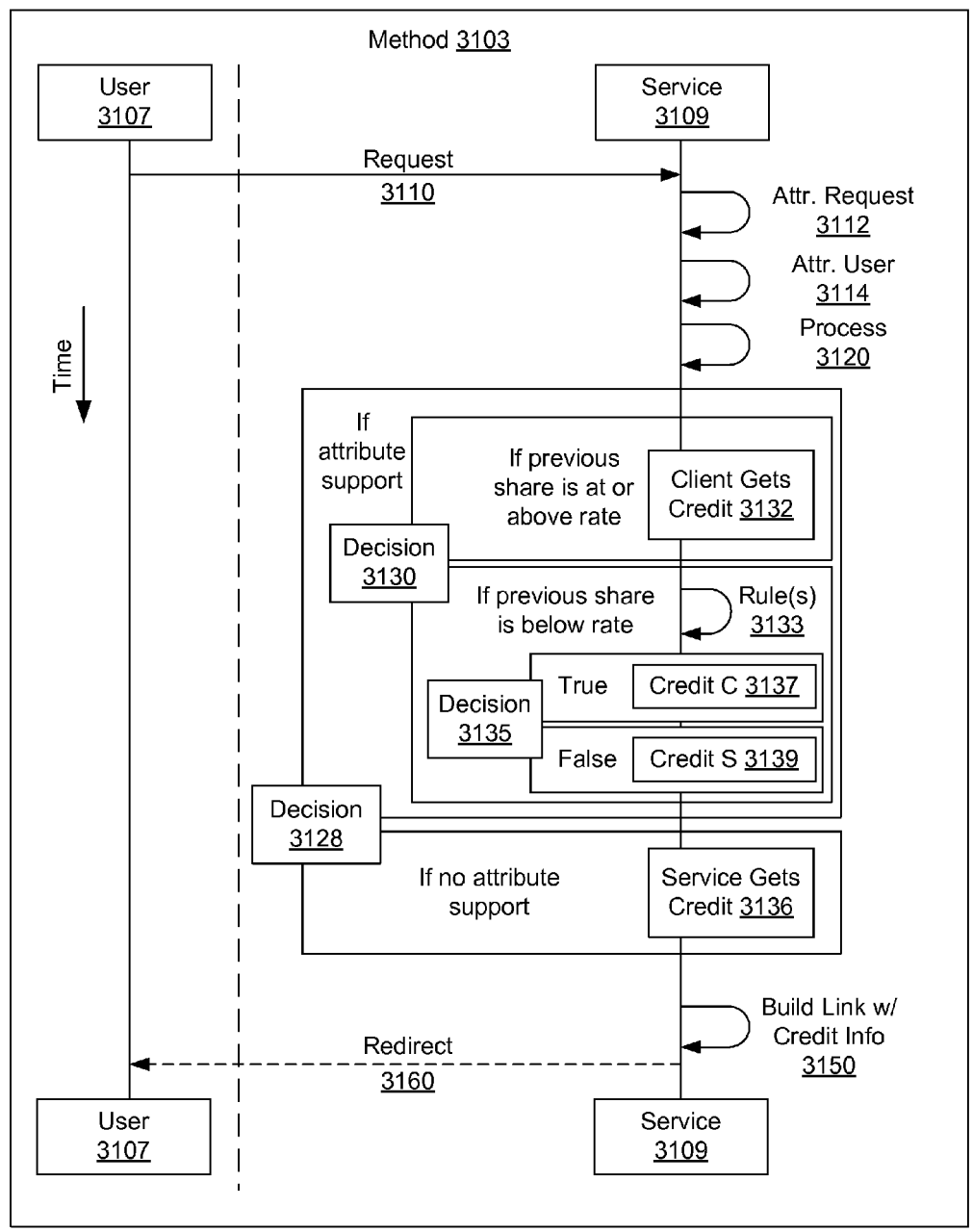
FIG. 9 is an example of a method.

FIG. 9 shows an example of a method 3103 that includes various features, actions, etc. of the method 3100 of FIG. 7 and the method 3101 of FIG. 8. As shown, the method 3103 may include determining one or more attributes 3112 that may be associated with the request 3110 and determining one or more attributes 3114 that may be associated with the user 3107. As an example, information may accompany a request, which itself may directly include one or more attributes and/or may provide information that may assist with determining one or more attributes (e.g., via parsing, locating, searching a database or databases, etc.).

In the example of FIG. 9, a decision 3128 may be made at least in part on the basis of one or more attributes, attribute support, etc. For example, if no attribute support exists, the method 3103 may proceed to credit the service 3109 (see, e.g., block 3136). As to the decision 3130, it may optionally account for one or more attribute in deciding credit (e.g., client gets credit 3132). As shown in FIG. 9, the decision 3130 may cause the method 3103 to access one or more rules 3133 (e.g., one or more criteria, historic information, etc.) and based at least in part thereon, the method 3103 may include making a decision 3135, for example, as to whether a condition is true or false. For example, an attribute or attributes may be considered with respect to one or more rules (e.g., criteria, etc.) to decide whether a condition or conditions are met (e.g., true or false, etc.). Based at least in part on such a decision process, the method 3103 may determine that to credit a client 3137 or to credit the service 3139. While the example of FIG. 9 shows "true" in association with block 3137 for crediting a client and "false" in association with block 3139 for crediting the service 3109, other logic, reverse logic, etc. may optionally be implemented (e.g., based at least in part on selection logic, rule logic, etc.).

In the example of FIG. 9, crediting of the service 3109 per the block 3139 may be an active share credit while crediting of the service 3109 per the block 3136 may be a passive share credit.

As an example, a rule may pertain to a geographic location of a user. For example, if a base country matches a user country, then a condition may be "true" and a client may be accorded credit (e.g., affiliate program information for a client of a service may be formulated into a link, etc.); otherwise, a service may be accorded credit (e.g., affiliate program information for a service may be formulated into a link, etc.).

Figure 10:
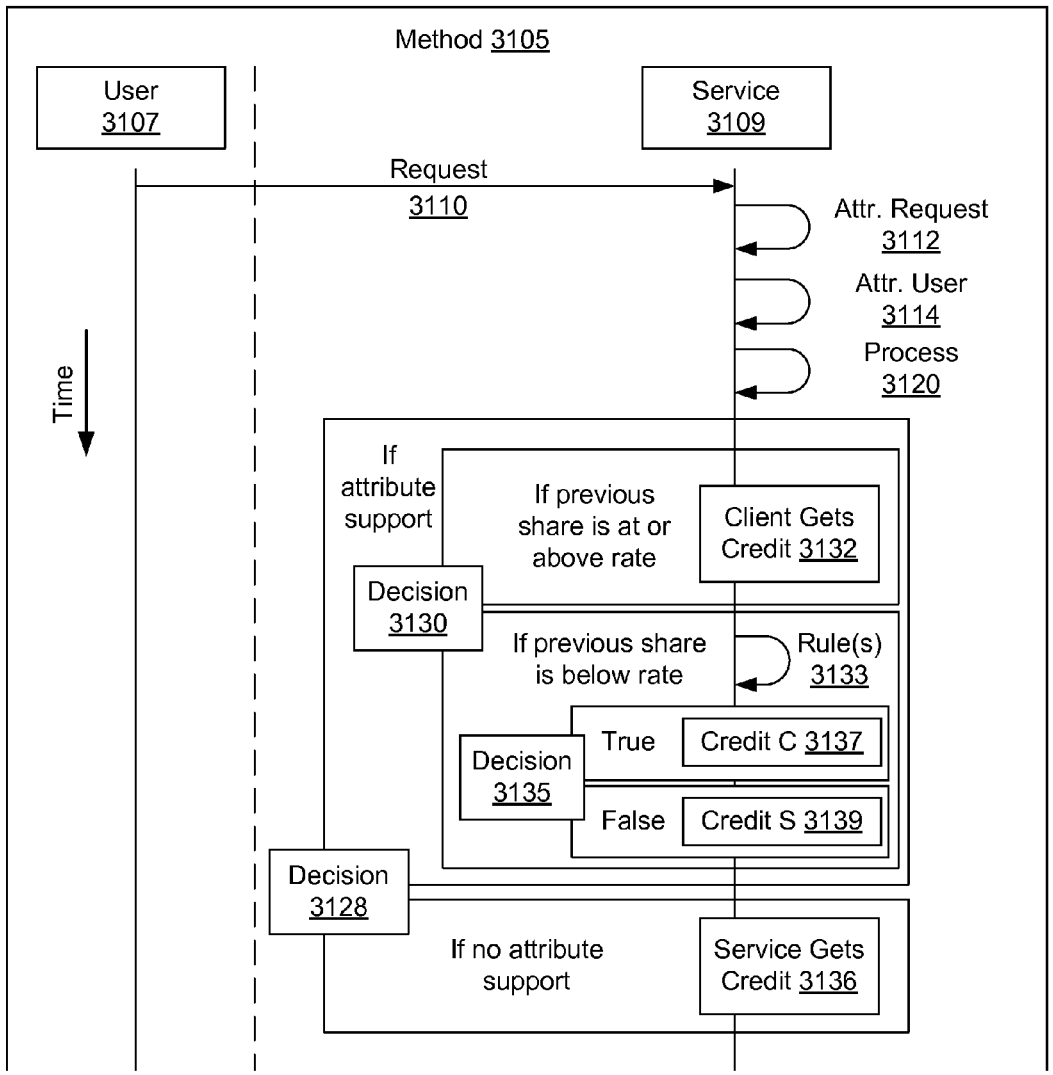
FIGS. 10 and 11 are an example of a method.
Figure 11:
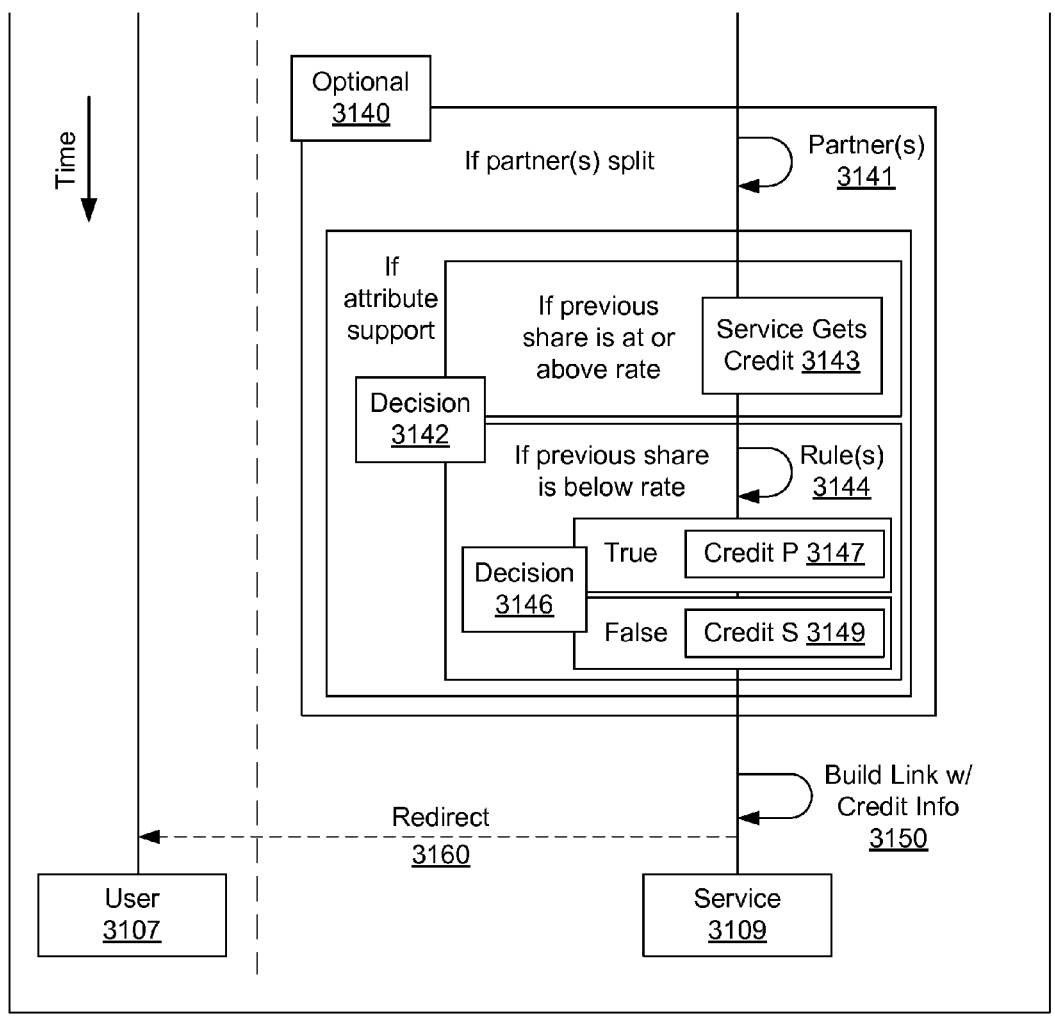

FIGS. 10 and 11 show an example of a method 3105 that includes various features, actions, etc. of the method 3100 of FIG. 7, the method 3101 of FIG. 8 and the method 1303 of FIG. 9. As shown, the method 3105 may include determining one or more attributes 3112 that may be associated with the request 3110 and determining one or more attributes 3114 that may be associated with the user 3107. As an example, information may accompany a request, which itself may directly include one or more attributes and/or may provide information that may assist with determining one or more attributes (e.g., via parsing, locating, searching a database or databases, etc.).

As shown in FIG. 11, the method 3105 can include an optional process 3140 that may include decision making, for example, with respect to one or more partners (e.g., entities other than the service and the client). Per the optional process 3140, if the service is to get credit (e.g., for a user click, etc.), a determination may be made as to whether one or more partners may receive at least a portion of credit (e.g., multiple party click credit, different types of credit, etc.). For example, a determination may be made with respect to one or more attributes associated with a request, a user, a user and a request, etc. (see, e.g., determination of request attribute(s) 3112 and/or determination of user attribute(s) 3114 of FIG. 10). As shown in the example of FIG. 11, a decision 3142 may follow, if attribute support is available with respect to one or more partners, as to share (e.g., split). Such a decision may be based at least in part on one or more criteria (e.g., rules, history, etc.). For example, if a previous share is at or above a predetermined share rate (e.g., percentage, currency amount, etc.), the service 3109 may get credit 3143; whereas, if a previous share is below a predetermined share rate (e.g., percentage, currency amount, etc.), a determination may be made by accessing, referencing, etc. one or more rules 3144. In such an example, the rule-based determination 3144 may be based at least in part on one or more attributes (e.g., request, user, partner, etc.). As an example, a decision 3146 may follow from the rule-based determination 3144, for example, where if a condition is "true", at least some credit is given to one or more partners 3147 and where if a condition is "false", the service 3109 may be credited 3149.

As an example, "clicks" may be numerous. For example, consider a number of clicks of the order of one hundred or more. A determination may be based at least in part on statistics, probability, etc. For example, if historic data indicates that a service has been credited above a predetermined percentage, a number of subsequent clicks may be credited to another entity such as a partner or partners. As a numeric example, consider an 85 percent credit rule to a client of the service, a 10 percent credit rule to a service and a 5 percent credit rule to a partner. Where the service has been credited above 10 percent, a number of subsequent clicks may be credited to the client or the partner, for example, to help assure that a service does not accumulate a certain percent above 10 percent (e.g., for a period of time, etc.). In other words, an algorithm (e.g., selection logic, etc.) may act to bias against overages of a service (e.g., in favor of a client and/or a partner). As an example, a crediting approach may operate according to a time window (e.g., an hour, a day, a week, a month, etc.), optionally based on a rate of clicks per unit time (e.g., estimated, historic, etc.).

As an example, a client of a service may assign up to X percent of its clicks to the service. In such an example, the X percent may be for one or more attributes that meet one or more criteria. For example, consider a rule where a client is credited with 100 percent of clicks for users determined to be in a base country of the client and another rule that assigns X percent of foreign clicks to the service.

As an example, a click share approach may include active and passive sharing. For example, consider an approach where a client is lacking affiliate programs in certain countries. In such an example, a service may earn clicks from those countries first, taking 100 percent of the affiliate revenue. In such an example, if collectively, those clicks add up to 15 percent of the service's client's total affiliated clicks, click-based payment of the service may be satisfied (e.g., assuming a 15 percent service share). And, if those do not total to 15 percent, an active process may be implemented.

In an active approach, a service may be credited with clicks for one or more affiliate program(s) that a client has signed up for. For example, if a client has the United States as a base country and had signed up in Canada with an affiliate program, the service may get a portion of the clicks the client would have earned through the Canadian affiliate program. However, such an approach may be limited, for example, accounts earning less than 100 clicks in a 24-hour period may be tagged for client credit (e.g., to help maximize client earnings). As an example, once a total of X percent (e.g., passive and active clicks) has been reached for a period of time, a client's "pay" to a service may be considered as having been satisfied. As an example, an approach may be pay service first, pay client first, or other such as pay service and pay client to target a desired predetermined percentage, currency amount, number of clicks, etc.

As an example, a service may provide a dashboard for a client (e.g., a website, etc.). In such an example, a client may access the dashboard to visualize click information, associated statistics, etc. As an example, a service and a client (e.g., and optionally one or more partners) may be compensated by one or more affiliate networks (e.g., affiliate programs, etc.).

As an example, a method may be a "Click Share" method, for example, as described with respect to one or more of FIGS. 7, 8, 9, 10 and 11. As an example, logic of a method such as that of FIG. 7 may be described as follows:

```
title Click Share
User->Service: Request Url
Service->Service: Process request
    alt If previous share is at/above rate
        note over Service: Client gets credit
    else if below rate
        note over Service: We get credit
    end
Service->Service: Build outgoing link with proper beneficiary
Service-->User: Redirect to outgoing link
```

As an example, a click share method may include so-called skimming or a passive share. A user may be someone clicking on a link on a website, which is routed to a service for processing. A client of the service may have a defined rate (e.g., 15%) where, if above or below the rate, credit may be determined accordingly.

As an example, the method of FIG. 8 may be a "Click Share+User Attribute" method. As an example, logic of such a method may be described as follows:

```
title Click Share + User Attribute
User->Service: Request Url
Service->Service: Determine a given user attribute(s)
Service->Service: Process request
alt If Client account supports user attribute(s)
    alt If previous share is at/above rate
        note over Service: Client gets credit
    else if below rate
        note over Service: We get credit (Active share)
    end
    else if Client doesn't support user attribute(s)
        note over Service: We get credit (Passive share)
    end
Service->Service: Build outgoing link with proper beneficiary
Service-->User: Redirect to outgoing link
```

As an example, such a method may include acting on where a user is coming from and where they are being sent to (e.g., advertising, etc.). A user attribute may be the device used, where from, etc. As to where from as an attribute, this may specify country (e.g., region, etc.). If a client supports the user, based on attribute, then credit may be determined accordingly. As an example, for an ad service, if from a device such as iPad, Android, PC, Mac, etc., the routing may be completed based on a device attribute (e.g., OS attribute, etc.).

As an example, the method of FIG. 9 may be a "Click Share+User/Request Attribute(s)" method. As an example, logic of such a method may be described as follows:

```
title Click Share + User/Request Attribute(s)
User->Service: Request Url
Service->Service: Determine given Request attribute(s)
Service->Service: Determine given User attribute(s)
Service->Service: Process request
    alt If Client account supports user attribute(s)
        alt If previous share is at/above rate
            note over Service: Client gets credit
        else if below rate
    Service->Service: check rule(s) based on User/Request attributes
            alt If check(s) true (i.e. base country matches users country)
                note over Service: Client gets credit
            else if check(s) false
                note over Service: We get credit (Active share)
            end
        end
    else if Client doesn't support user attribute(s)
        note over Service: We get credit (Passive share)
    end
Service->Service: Build outgoing link with proper beneficiary
Service-->User: Redirect to outgoing link
```

In such an example, the method may figure out "rate" and how/where to credit/update it per click. As an example, a link may be built on a US iTunes® link, then this may be an attribute (e.g., a US request attribute); whereas, for example, for a Canadian link, it may be a CA request attribute. As an example, an affiliate program may be a factor (e.g., an attribute) in a method. As an example, attributes may include device, country, affiliate, etc.

As an example, the method of FIGS. 10 and 11 may be a "Partner Split Click Share+User/Request/Partner Attribute(s)" method. As an example, logic of such a method may be described as follows:

```
title Partner Split Click Share + User/Request/Partner Attribute(s)
User->Service: Request Url
Service->Service: Determine given Request attribute(s)
Service->Service: Determine given User attribute(s)
Service->Service: Process request
    alt If Client account supports user attribute(s)
        alt If previous share is at/above rate
            note over Service: Client gets credit
        else if below rate
    Service->Service: check rule(s) based on User/Request attributes
            alt If check(s) true (i.e. base country matches users country)
                note over Service: Client gets credit
            else if check(s) false
                note over Service: We get credit (Active share)
            end
        end
    else if Client doesn't support user attribute(s)
        note over Service: We get credit (Passive share)
    end
    opt if we get credit and split our clickshare for client with a Partner
    Service->Service: Determine given Partner attribute(s)
        alt If previous split is at/above rate
            note over Service: We get credit
        else if below rate
            Service->Service: check rule(s) based on User/Request/Partner attributes
            alt If check(s) true (i.e. Partner supports target attributes, like CC)
                note over Service: Partner gets credit
            else if check(s) false
                note over Service: We get credit (Active share)
            end
        end
    end
Service->Service: Build outgoing link with proper beneficiary
Service-->User: Redirect to outgoing link
```

As an example, information may be collected, aggregated, etc. and provided to one or more parties. Such information may be provided on a basis, optionally in lieu of rate, lesser points, etc. For example, information on device (e.g., device attribute, OS attribute, etc.) and purchases of goods or services may be of value to one or more parties (e.g., client, affiliate, advertiser, device maker, etc.). Information about use of a link may be aggregated, click stream information may be aggregated, etc. Such aggregated information may be of value to one or more parties. As an example, opportunities exist for "buy in" or participation in the click stream. For example, a party may enter a click stream for one or more purposes, whether known or knowable to a user or not. For example, a party may enter a click stream based on one or more attributes (e.g., location, device, OS, song, etc.).

Instructions for performing operations described herein may optionally be stored in a computer (e.g. a computer, a phone, a tablet, etc., with circuitry such as a processor) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus. A computer-readable medium can include any mechanism for storing information in a form readable by a machine (e.g., a computer).

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A service provider system that responds to receipt of a specialized URL to generate a redirection URL and that generates a client report based at least in part on a plurality of receipts of the specialized URL, the service provider system comprising:

an interface that receives a specialized URL, responsive to actuation of the specialized URL via a remote device, wherein the specialized URL comprises information and is associated with an entity that is a client of a service provider as associated in a service provider database;

processor-based circuitry that processes at least a portion of the information for entity information associated with the entity, Internet merchant information associated with an Internet merchant that is not the entity, item information associated with an item available via the Internet merchant, device information associated with the device that caused transmission of the specialized URL to the interface, and geographic location information associated with a geographic location of the device;

processor-based circuitry that accesses database entries in an entity field and in one or more affiliate program criterion fields wherein the one or more affiliate program criterion fields comprise one or more geographic location database entries and wherein the processor-based circuitry that accesses database entries in the entity field and in the one or more affiliate program criterion fields accesses the service provider database;

processor-based circuitry that associates the specialized URL with an entity field database entry based at least in part on the entity information;

processor-based circuitry that comprises selection logic that selects at least one affiliate program from a plurality of affiliate programs based at least in part on at least one of the one or more geographic location database entries of the one or more affiliate program criterion fields as associated with the entity field database entry and wherein the selection logic selects the at least one affiliate program based at least in part on historical information for the entity field database entry;

processor-based circuitry that persists at least the device information, the geographic location information associated with the geographic location of the device and the selected at least one affiliate program to the service provider database;

processor-based circuitry that formulates a redirection URL based at least in part on the Internet merchant information wherein the redirection URL comprises affiliate program information for the at least one selected affiliate program;

processor-based circuitry that accesses the service provider database responsive to another receipt of the specialized URL associated with the item to facilitate formulation of another corresponding redirection URL; and processor-based circuitry that accesses the service provider database to generate a client report based at least in part on a plurality of receipts of the specialized URL associated with the item.

2. The service provider system of claim 1 wherein the one or more affiliate program criterion fields comprise a percentage entry.

3. The service provider system of claim 1 wherein the one or more affiliate program criterion fields comprise an operating system entry.

4. The service provider system of claim 1 wherein the one or more affiliate program criterion fields comprise a device type entry.

5. The service provider system of claim 1 wherein the one or more affiliate program criterion fields comprise a type of good entry.

6. The service provider system of claim 1 wherein the service provider database comprises database entries for a plurality of entities and for a plurality of affiliate programs.

7. A service provider method for responding to receipt of a specialized URL to generate a redirection URL and for generating a client report based at least in part on a plurality of receipts of the specialized URL, the method comprising:

receiving a specialized URL via an interface, responsive to actuation of the specialized URL via a remote device, wherein the specialized URL comprises information and is associated with an entity that is a client of a service provider as associated in a service provider database;

processing at least a portion of the information for entity information associated with the entity, Internet merchant information associated with an Internet merchant that is not the entity, item information associated with an item available via the Internet merchant, device information associated with the device that caused transmission of the specialized URL to the interface, and geographic location information associated with a geographic location of the device;

accessing database entries in an entity field and in one or more affiliate program criterion fields by accessing the service provider database wherein the one or more affiliate program criterion fields comprise one or more geographic location database entries;

associating the specialized URL with an entity field database entry based at least in part on the entity information;

implementing selection logic that selects at least one affiliate program from a plurality of affiliate programs based at least in part on at least one of the one or more geographic location database entries of the one or more affiliate program criterion fields as associated with the entity field database entry and wherein the selection logic selects the at least one affiliate program based at least in part on historical information for the entity field database entry;

persisting at least the device information, the geographic location information associated with the geographic location of the device and the selected at least one affiliate program to the service provider database;

formulating a redirection URL based at least in part on the Internet merchant information wherein the redirection URL comprises affiliate program information for the at least one selected affiliate program accessing the service provider database responsive to another receiving of the specialized URL associated with the item to facilitate formulation of another corresponding redirection URL; and accessing the service provider database to generate a client report based at least in part on a plurality of receipts of the specialized URL associated with the item.

8. The service provider method of claim 7 wherein the one or more affiliate program criterion fields comprise a percentage entry.

9. The service provider method of claim 7 wherein the one or more affiliate program criterion fields comprise an operating system entry.

10. The service provider method of claim 7 wherein the one or more affiliate program criterion fields comprise a device type entry.

11. The service provider method of claim 7 wherein the one or more affiliate program criterion fields comprise a type of good entry.

12. The service provider method of claim 7 wherein the URL comprises a URL of the client of the service provider.

* * * * *